United States Patent
Cavender, Jr.

[15] 3,666,745

[45] May 30, 1972

[54] PROCESS FOR POLYMERIZING OLEFINS

[72] Inventor: James V. Cavender, Jr., Texas City, Tex.

[73] Assignee: Monsanto Company, St. Louis, Mo.

[22] Filed: May 28, 1970

[21] Appl. No.: 41,413

[52] U.S. Cl.................260/94.9 C, 260/88.2 D, 260/93.1, 260/93.5, 260/93.7
[51] Int. Cl............................C08f 1/56, C08f 3/06
[58] Field of Search................260/88.2 D, 94.9 C, 93.7

[56] References Cited

UNITED STATES PATENTS

| | | |
|---|---|---|
| 3,254,140 | 5/1966 | Hagemeyer et al.................260/88.2 |
| 2,898,327 | 8/1959 | McCulloch et al. .................260/88.2 |
| 3,051,690 | 8/1962 | Vandenberg.........................260/88.2 |
| 3,163,611 | 12/1964 | Andersen et al.....................260/94.9 |

*Primary Examiner*—Joseph L. Schofer
*Assistant Examiner*—Edward J. Smith
*Attorney*—Elizabeth F. Sporar, L. Dan Tucker and Neal E. Willis

[57] ABSTRACT

Polyolefins with characteristics which make them particularly suitable for blowing into bottles are obtained by polymerizing olefins in contact with so-called Ziegler catalysts and employing as a modifying agent for the polymerization a mixture of hydrogen and acetylene.

5 Claims, 1 Drawing Figure

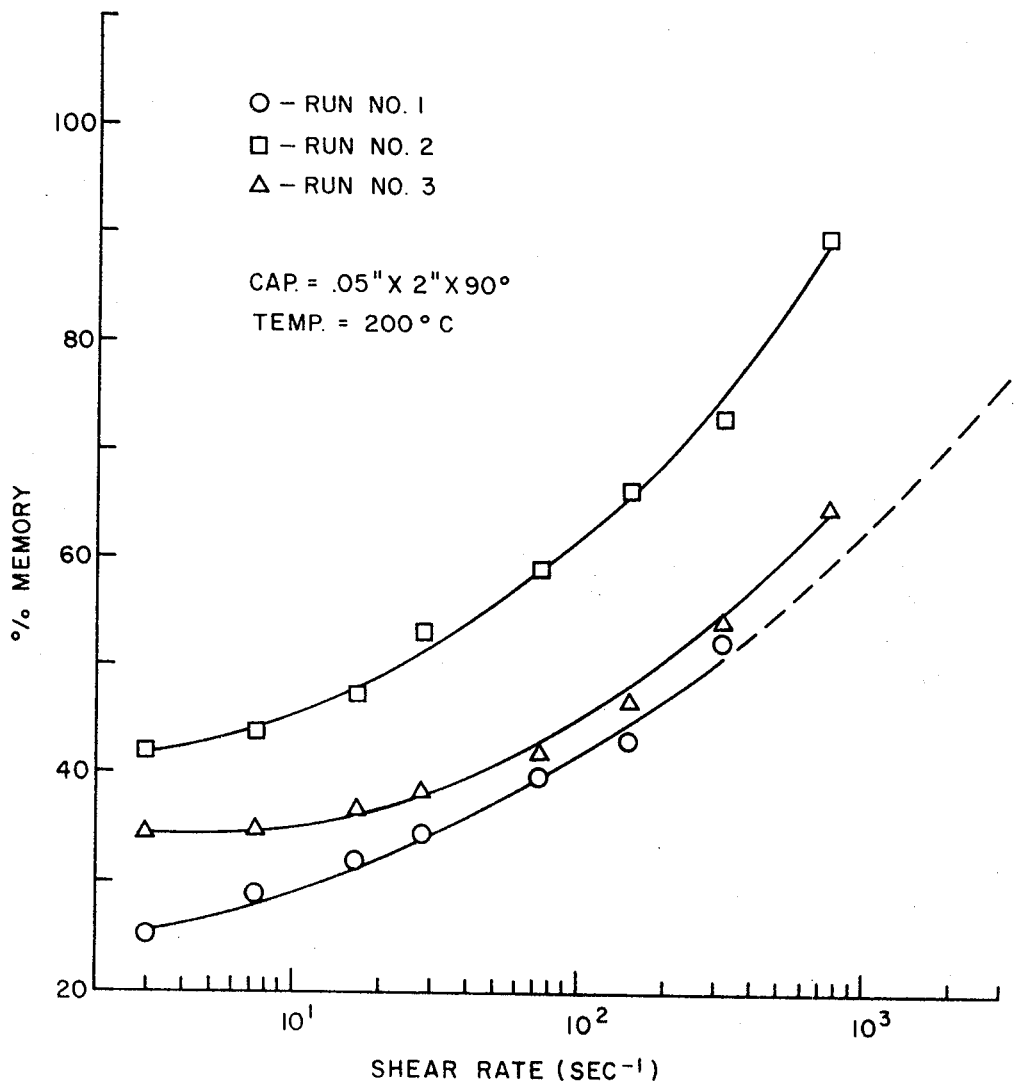

PROCESS FOR POLYMERIZING OLEFINS

BACKGROUND OF THE INVENTION

The present invention relates to the polymerization of olefins at relatively low pressures for the production of olefin polymers of high molecular weight and to the control of the polymerization so as to produce polymers with certain desirable physical properties.

It has been well known for some time now that ethylene and other olefins can be polymerized alone to produce homopolymers or in combinations to produce interpolymers or copolymers at relatively low pressures and temperatures by using so-called Ziegler catalysts. Ziegler catalysts may be described broadly as consisting of various combinations of strong reducing agents such as organometallic compounds of an alkali metal, alkaline earth metal, zinc, earth metal or a rare earth metal in combination with various reducible heavy metal compounds such as the halides, alkoxides, acetyl-acetonates, etc., of the metals of Groups IV-B, V-B, VI-B and VIII of the periodic system. Among the most active types of catalyst for this reaction are those consisting of a reduced titanium halide in the presence of an organoaluminum compound such as aluminum alkyls, aluminum dihydrides, alkyl aluminum halides and the like as an activator. Particularly preferred are catalysts containing $TiCl_4$ with an alkyl aluminum compound such as a trialkyl aluminum, dialkyl aluminum halide or a dialkyl aluminum hydride for example.

With the catalysts just described, high yields of good quality, high-molecular-weight, solid polymers of ethylene and other olefins have been produced. Generally, these polymers are of high density, that is, 0.93 and above, but intermediate density resins can also be produced. The molecular weight of the polymers so produced fall within a wide range. Polymers having molecular weights from 2,000 to 300,000 and as high as 3,000,000 or more can be produced. Control of molecular weight can be effected to some extent by controlling process variables but in view of the general interdependence of process variables such control is usually effected by addition of various amounts of modifying agents such as hydrogen as described, for example, in U.S. Pat. No. 3,051,690 or acetylene as disclosed in U.S. Pat. No. 2,898,327. Polymers so modified, although they have many desirable properties, still do not possess all the attributes demanded in the speciality markets of today's plastics. For example, hydrogen-modified polymers of suitable density and molecular weight cannot be successfully blown into certain types of bottles because they either possess too low an elastic memory and, consequently, fail to swell sufficiently with the result that the molds do not fill completely to produce the desired shapes, or they exhibit melt fracture at high bottle-blowing shear rates probably because of an inherently narrow molecular weight distribution. On the other hand, resins prepared by using acetylene as a modifier in the polymerization to control molecular weight are also unsuitable as bottle stock because they possess too high an elastic memory. Such resins when blown into bottles exhibit high shrink-back which causes contraction of the parison and makes bottle weight difficult to control. The present invention overcomes these drawbacks and affords various other advantages which will be apparent from the following description thereof.

SUMMARY OF THE INVENTION

According to the present invention, high-density olefinic polymers suitable for processing into bottles are produced by polymerizing an olefin such as ethylene, either alone or in admixture with small amounts of another olefin, in contact with a so-called Ziegler catalyst in the presence of a mixture of acetylene and hydrogen as a modifier for the polymerization. In the preferred embodiment of the invention, the polymerization is controlled by feeding from 25 to 500 parts acetylene per million parts of ethylene in the reactor feed gas and then adding approximately from 20 to 40 mole percent hydrogen to the reactor during the polymerization. Preferably, the acetylene concentration is maintained between 75 and 300 ppm while the hydrogen concentration is maintained at from 25 to 30 mole per cent.

BRIEF DESCRIPTION OF THE DRAWING

FIG. 1 shows curves obtained by plotting per cent memory for the polymers obtained in the runs given in the example against shear rate.

DESCRIPTION OF THE PREFERRED EMBODIMENT

The invention is illustrated in the following example which is not intended to be construed as limiting it in any manner whatsoever.

EXAMPLE

Several ethylene polymerization runs were conducted wherein hydrogen, acetylene and a mixture of hydrogen and acetylene, respectively, were employed to serve as modifying agents in the polymerization. These polymerizations were carried out in a reactor consisting of a jacketed section of 8-in., Schedule-20, stainless-steel pipe with a welded elliptical bottom and a flange elliptical head. Baffles and a triple turbine assembly were used to provide agitation. Overall reactor length was 2 ft. 3 in. and total reactor volume was about 3 gallons.

The reactor was conditioned by cleaning, purging with hot ethylene or nitrogen to establish operating levels of water and oxygen at approximately 5 and 2 parts per million, respectively, and charging with hexane, the reaction medium. The catalyst components, $TiCl_4$, diisobutylaluminum hydride and isobutanol, were all diluted in hexane to facilitate metering and fed to a two-stage complexer, the diisobutyl-aluminum hydride and $TiCl_4$ solutions being added to the bottom stage where they were reacted to form the catalyst complex and the isobutanol and hexane being added in the top stage. The complexer contents were agitated and overflowed to the reactor where they were charged below the liquid surface on a continuous basis. Acetylene was introduced into the ethylene feed stream and this stream was charged to the reactor at a rate to maintain reactor pressure within the desired range with adjustment in ethylene flow being made gradually to stay within this range. Cylinder hydrogen pressure-regulated to 125 psig was deoxygenated by passage through a BTS column, passed through a drying column and then metered to the reactor.

At the end of the polymerization reaction, the slurry from the reactor was discharged into collection vessels where it was quenched with methanol, the resulting slurry was heated to 95° C for 30 minutes, then cooled and transferred into 2-gallon stainless-steel sample containers for subsequent transfer to a Buchner funnel. The finishing steps consisted of filtration, washing, and stabilization, all accomplished in a large Buchner funnel. Methanol and hexane were used for washing the polymer and a solution of a phenolic anti-oxidant was employed for stabilization. The polymer was dried and a 200-g portion was employed for determination of physical properties. Operating conditions and evaluation data for the several runs made are given in Table I.

TABLE I

| Run No. | 1 | 2 | 3 |
|---|---|---|---|
| A. Operating Variables | | | |
| Al/Ti mole ratio | 0.8 | 0.75 | 0.70 |
| ROH/Ti mole ratio | 0 | 0.65 | 0.60 |
| Polym. Temp., °C. | 80 | 82 | 80 |
| Pressure, p.s.i.g. | 37 | 35 | 35 |
| Reactor Dwell, hr. | 1.5 | 1.5 | 1.5 |
| Reactor Volume, ml. | 7300 | 7300 | 7300 |
| $C_2H_2$, ppm | 0 | 354 | 329 |
| $H_2$, mole % | 45 | 0 | 27 |
| B. Polymer Properties | | | |
| MI($I_2$) | 0.67 | 0.33 | 0.30 |
| $I_{10}$ | 7.6 | 8.2 | 6.3 |
| $I_{10}/I_2$ | 11.3 | 24.8 | 21.0 |
| Density, g./ml. | 0.9625 | 0.9586 | 0.9570 |

| | | | |
|---|---|---|---|
| Melt fracture, sec.$^{-1}$ | 750 | 1450 | 1450 |
| Memory, 300 sec.$^{-1}$, % | 52.0 | 76.5 | 54.5 |

The following methods were employed in determining the polymer properties. Melt index ($I_2$) was determined by ASTM Test D-1238-65T using a 2,160-gram weight. Melt extrusion rate ($I_{10}$) was determined using the same method employed for determination for melt index except that the weight on the sample was 10 kg. ASTM Test D-792-60T was employed for determining density. Memory was determined by operating a melt rheometer at a temperature of 200° C, using a capillary with an internal diameter of 0.05 in., a land length of 2 in. and an entrance angle of 90°. The rheometer plunger was set to force the polymer melt through the capillary at several speeds which would produce shear rates calculated at from 3 to about 1,500 sec$^{-1}$. At each speed, the extrudate diameter was measured to calculate a memory value. Memory is defined as ($D_e - D_o)/(D_o) \times 100$ where $D_e$ is the diameter of the extrudate and $D_o$ is the diameter of the capillary. All memory values reported in the Table were measured at 300 sec$^{-1}$ since it has been found most convenient to use this memory. Melt fracture is defined as that shear rate at which the extrudate from the die in the determination of memory becomes very irregular based on visual observation.

It will be seen from Table I and the accompanying FIG. 1 that per cent memory for the acetylene-modified polymer (Run No. 2) is quite high in comparison with that of the hydrogen-modified polymer. Polymers with such high memory values are unsuitable for bottle blowing because they exhibit high shrink-back causing contraction of the parison during the blowing operation. Resins with suitable processability for blowing into bottles at high shear rates will generally have a memory at 300 sec$^{-1}$ of from about 47 per cent to about 57 per cent depending upon their melt index. Thus, the hydrogen-modified polymer of Run No. 1 has an acceptable memory based on its melt index but exhibits melt fracture at low shear rates (750 sec$^{-1}$) and, accordingly, is unsuitable for bottle-blowing operations in which high shear conditions are employed because rough or discontinuous surfaces will result after fabrication. The polymer product from Run No. 3 using the process of the present invention wherein polymerization is effected with a mixture of both acetylene and hydrogen being employed as modifying agent has an acceptable memory as well as the ability to withstand melt fracture at high shear rates (1,450 sec$^{-1}$) and, hence, is eminently suitable as a bottle-grade resin for machines employing high shear rates.

The present invention is broadly applicable to the preparation of all Ziegler-type solid polymers, i.e., all solid polymers prepared by polymerizing a monomer or mixture of monomers in the presence of a Ziegler-type catalyst. It is particularly suited for use with polymers prepared by polymerizing ethylenically unsaturated hydrocarbons or olefins such as ethylene as illustrated in the example above, propylene, butene-1, heptene-1, octadecene-1, dodecene-1, 3-methylbutene, 4-methylbutene-1, styrene, vinyl cyclohexene and the like either alone, with each other, or with other monomers especially diolefins such as butadiene, isoprene, piperylene, cyclopentadiene, 1,4-pentadiene and the like.

As mentioned previously, the Ziegler catalysts useful for the polymerization of the monomers mentioned in the foregoing paragraph are those comprising the product formed from the reaction of a compound of a transition metal selected from Group IV-B, V-B or VI-B of the Periodic Table of the elements with a metallic reducing agent. Preferably, the transition metal compounds employed are the compounds of titanium and zirconium with the halides being especially preferred although oxyhalides, organic salts or complexes of these elements can be used. The titanium or zirconium in the compounds employed should be in a valence form higher than the lowest possible valence. The tetrahalides, trihalides, mixtures of di-, tri-, and tetrahalides, etc., can be used. Titanium or zirconium compounds other than the halides which can be employed include alcoholates, alkoxides or esters such as titanium tetramethoxide (also called tetramethyltitanate), titanium triethoxide, tripropoxytitanium chloride, zirconium tetra-n-butoxide, or complexes such as zirconium acetylacetonate, $K_2TiF_6$ or salts of organic acids such as the acetates, benzoates, etc., of titanium and zirconium.

Preferred as metallic reducing agents are organoaluminum compounds such as triethylaluminum, tributylaluminum, triisobutylaluminum, tripropylaluminum, triphenylaluminum, trioctylaluminum, tridodecylaluminum, dimethylaluminum chloride, diethylaluminum chloride, dipropylaluminum fluoride, diisobutylaluminum chloride, diisobutylaluminum hydride, diethylaluminum chloride and the like. Mixtures of the foregoing types of aluminum compounds can also be employed. The total reaction mixtures obtained in the formation of such compounds, i.e., by treatment of metallic aluminum with alkyl halides resulting in the formation of such mixtures as dialkylaluminum halides plus monoalkylaluminum dihalides, termed alkylaluminum sesquihalides, are also suitable. In addition to the organoaluminum compounds organometallic compounds of magnesium or zinc can be used. Also suitable are other reducing agents such as alkali metals, e.g., lithium, sodium, potassium; alkali hydrides, e.g., lithium hydride, sodium hydride; complex alkali aluminum and alkali boron hydrides, e.g., lithium aluminum hydride; complexes of alkali metal hydrides with boron triaryls or boric acid esters or boronic acid esters or boronic acid esters and the like.

As employed commercially, such Ziegler catalysts are preferably formed by the reaction of titanium tetrachloride with an aluminum compound selected from the class consisting of aluminum trialkyls, dialkyl aluminum halides and dialkyl aluminum hydrides. However, the process of the present invention is not limited in its applicability to polymerization processes in which such preferred Ziegler catalysts are employed.

The quantities of catalytic components can be varied considerably. The mole ratio of reducing agent to transition metal compound can be in the range of from 0.3:1 to 10:1, on up to 15:1 or even higher. With an organoaluminum compound and a titanium halide the preferred Al:Ti mole ratios are those between 1:3 and 5:1.

The catalyst is suspended for the polymerization reaction in an inert liquid reaction medium or diluent sometimes referred to as a liquid slurrying medium. Preferably, the diluent should be low-boiling so that trace amounts left on the polymers can be removed conventionally in a drying step. Suitable for use as inert liquid reaction media or diluents are saturated aliphatic and alicyclic hydrocarbons, aromatic hydrocarbons, halogenated hydrocarbons, and saturated ethers. Of these, the hydrocarbon solvents such as pentanes, n-hexane, n-heptane, n-octane and the various isomeric hexanes, heptanes and octanes, cyclohexane, methylcyclopentane, dodecane and industrial solvents composed of saturated and/or aromatic hydrocarbons such as kerosene, naphthas and the like are more generally used, with the saturated aliphatic hydrocarbons having from about five to about 12 carbon atoms being preferred. However, benzene, toluene, ethylbenzene, cumene, decalin, ethylene dichloride, chlorobenzene, diethyl ether, ortho-dichlorobenzene, dibutyl ether and the like can be used. The quantity of liquid reaction medium or diluent used is subject to substantial variation. The amount may be kept low in the reaction mixture such as from 0.1 to 0.5 part by weight of diluent per part by weight of total polymer produced. However, it is often helpful in obtaining sufficient contact between monomer and catalyst and in aiding removal of heat of reaction to employ larger amounts of the inert liquid suspending medium or diluent, for example, from about 4 to about 30 parts by weight of the liquid medium or diluent per part by weight of total polymer produced.

A reactive organic oxygen compound can be employed to modify the characteristics of the catalyst so as to result in a narrowing of the molecular weight distribution of the polymer product. Such compounds are, in general, compounds containing active oxygen-containing functional groups such as, for example, alcohols, ketones, aldehydes and organic acids. They are generally added to the dispersion of the Ziegler catalyst in an inert organic liquid but they can be added to the polyvalent reducible metal compound, an essential component of the Ziegler catalyst, and this compound then reacted with the reducing agent, the other essential component, to produce an active Ziegler catalyst.

In general, the amount of the reactive organic compound to be employed is in the neighborhood of 0.4 – 1.0 gram-mole/gram-atom of the multivalent metal in the metal compound that is reduced in preparing the catalyst, for example, $TiCl_4$. The amount of a reactive organic oxygen compound to be employed is best related to the amount of catalyst and will vary considerably depending upon the particular catalyst, its method of preparation, the particular reactive organic compound and the extent to which catalyst modification is desired. For each mole of the heavy metal compound which is reduced, when the said compound contains one atom of metal per molecule, the amount of a reactive organic compound to be used will generally be within the range of 0.1 – 2 moles. With Ziegler catalyst prepared by the interaction of diisobutylaluminum hydride with titanium tetrachloride, there is generally used an amount of reactive organic oxygen compound within the rage of from 0.1 to 1.5 moles per mole of $TiCl_4$ used, that is, per gram-atom of titanium.

Generally preferred as the reactive organic oxygen compound are alcohols although phenols can be employed as well. Suitable alcohols include all aliphatic, alicyclic, aromatic and heterocyclic alcohols. The aliphatic alcohols such as methanol, ethanol, n-propanol, isopropanol alcohol, isobutanol, pentanol, octanol and the like are especially suitable with isobutanol as the preferred modifier. Various other suitable alcohols are listed in U.S. Pat. No. 3,163,611 describing the modification of the Ziegler catalyst herein disclosed.

The amount of catalyst required is comparatively small. Generally, amounts from 0.1 to 5.0 per cent by weight based on the total weight of monomer charged are satisfactory although amounts as small as 0.01 per cent are sometimes permissible and larger amounts up to, say 20 per cent can be employed.

The polymerization reaction can be conducted over a wide range of temperatures from 0° to 100° C and higher if desired. Preferably, reaction temperature is maintained at about 65°–90 C. Likewise, while atmospheric is preferred, subatmospheric or superatmospheric pressures can be used. The applicability of the present process is not limited to any special catalyst, or catalyst suspending medium or particular conditions of temperature and pressure under which the polymerization reaction itself is carried out.

In practicing the process of the present invention, any anhydrous or substantially anhydrous (i.e., containing 25 parts of water per million parts of alcohol) alkyl alcohol containing from one to eight carbon atoms can be employed for quenching or destruction of the catalyst after the polymerization is complete and before separation of the polymer from the reaction mixture. Of the suitable alcohols which include methyl alcohol, ethyl alcohol, propyl alcohol, isobutyl alcohol, amyl alcohol, hexyl alcohol, octyl alcohol, and the like, methyl alcohol is the preferred quenching agent. The amount of alcohol used for quenching is critical only in the sense that it must be sufficient to destroy completely all catalyst activity and may be varied widely from about 1 per cent to about 300 per cent of the weight of the reaction mixture or polyolefin slurry being treated. The optimum amount for use will vary according to the quantity of catalyst present in the polymerizate. Generally, amounts from about 5 per cent to about 25 per cent by weight of the polymer slurry are satisfactory but the amount can be controlled as desired to provide an amount of alcohol sufficient to form a slurry of satisfactory fluidity while remaining within the bounds of economical operations.

The quenching operation and recovery of the polymer may be carried out according to well known conventional procedures but is preferably conducted in the manner described and claimed in U.S. Pat. No. 3,371,078 in order to insure that the greater part of the catalyst residues are removed from the polymer to render it less subject to color degradation on further processing.

What is claimed is:

1. A process for producing polyethylene having improved properties for processing into bottles which comprises contacting ethylene under polymerization conditions with a catalytic amount of a catalyst comprising a dialkylaluminum hydride and titanium tetrachloride in the presence of a mixture of from about 25 to about 500 parts of acetylene per million parts of said ethylene and from about 20 to about 40 mole per cent of hydrogen.

2. The process of claim 1 wherein said dialkylaluminum hydride is diisobutylaluminum hydride.

3. The process of claim 2 wherein said catalyst is modified by the addition of from about 0.1 to 1.5 moles per mole of titanium tetrachloride of a reactive organic oxygen compound selected from the group consisting of aliphatic, alicyclic, aromatic and heterocyclic alcohols.

4. The process of claim 3 wherein said catalyst modifier is isobutanol.

5. The process of claim 4 wherein the amount of acetylene employed is in the range from about 75 to about 300 parts per million parts of ethylene and the amount of hydrogen employed is in the range from about 25 to about 30 mole per cent.

* * * * *